(12) United States Patent
Babazadeh et al.

(10) Patent No.: US 9,998,020 B2
(45) Date of Patent: Jun. 12, 2018

(54) METHOD AND APPARATUS FOR EFFICIENT SWITCHING IN SEMI-RESONANT POWER CONVERTERS

(71) Applicant: Infineon Technologies Austria AG, Villach (AT)

(72) Inventors: Amir Babazadeh, Laguna Hills, CA (US); Robert Carroll, Andover, MA (US)

(73) Assignee: Infineon Technologies Austria AG, Villach (AT)

( * ) Notice: Subject to any disclaimer, the term of this patent is extended or adjusted under 35 U.S.C. 154(b) by 57 days.

(21) Appl. No.: 15/143,068

(22) Filed: Apr. 29, 2016

(65) Prior Publication Data

US 2017/0317595 A1     Nov. 2, 2017

(51) Int. Cl.
     *H02M 3/335*          (2006.01)
     *H02M 1/08*           (2006.01)
     *H02M 1/00*           (2006.01)

(52) U.S. Cl.
CPC ......... *H02M 3/33592* (2013.01); *H02M 1/08* (2013.01); *H02M 3/33507* (2013.01); *H02M 3/33576* (2013.01); *H02M 3/33569* (2013.01); *H02M 2001/0009* (2013.01)

(58) Field of Classification Search
CPC .... H02M 3/33507; H02M 3/158; H02M 1/08; H02M 2001/0009; H02M 1/1588; H02M 3/33592; H02M 3/33576; H02M 3/35693
See application file for complete search history.

(56) References Cited

U.S. PATENT DOCUMENTS

| | | | | |
|---|---|---|---|---|
| 6,674,274 | B2 * | 1/2004 | Hobrecht | H02J 1/102 323/268 |
| 6,919,713 | B2 * | 7/2005 | Hoshino | H02M 3/158 323/267 |
| 7,495,423 | B1 * | 2/2009 | Knight | H02M 3/1588 323/259 |

(Continued)

OTHER PUBLICATIONS

Hwu, K. I. et al., "Ultrahigh Step-Down Converter", IEEE Transactions on Power Electronics, vol. 30, No. 6, Jun. 2015, pp. 3262-3274.

*Primary Examiner* — Kyle J Moody
(74) *Attorney, Agent, or Firm* — Murphy, Bilak & Homiller, PLLC

(57) ABSTRACT

A voltage converter includes a power stage, a passive circuit, a synchronous rectification (SR) switch component, and a control circuit. The passive circuit couples the power stage to an output node of the voltage converter, and is switchably coupled to ground by the SR switch component. The SR switch component includes a plurality of SR switches, which are independently controllable. The control circuit determines which of the SR switches are to be activated/enabled, and only uses those SR switches in its variable switching of the voltage converter. The determination of which SR switches are to be activated/enabled is based upon an estimate of the output current for the voltage converter. By using more SR switches when the voltage converter is fully loaded, and fewer SR switches when it is lightly loaded, the power loss of the SR switch component is minimized and the voltage converter is more power efficient.

20 Claims, 11 Drawing Sheets

(56) References Cited

U.S. PATENT DOCUMENTS

| | | | |
|---|---|---|---|
| 8,253,398 B2* | 8/2012 | Nakamura | H02M 3/1588 323/225 |
| 8,843,180 B2* | 9/2014 | Brown | H02M 3/158 323/225 |
| 9,639,102 B2* | 5/2017 | Dally | G05F 1/563 |
| 9,793,799 B1* | 10/2017 | Babazadeh | H02M 1/08 |
| 9,806,621 B1* | 10/2017 | Babazadeh | H02M 1/08 |
| 9,812,971 B1* | 11/2017 | Tschirhart | H02M 3/33507 |
| 9,837,907 B1* | 12/2017 | Babazadeh | H02M 3/1588 |
| 2010/0013451 A1* | 1/2010 | Nakamura | H02M 3/1588 323/282 |
| 2014/0167720 A1* | 6/2014 | Chiang | H02M 3/158 323/282 |
| 2015/0115911 A1 | 4/2015 | Parto et al. | |
| 2015/0214841 A1* | 7/2015 | Ramorini | H02M 3/158 323/271 |
| 2017/0025961 A1* | 1/2017 | Seeman | H02M 1/08 |
| 2017/0222560 A1* | 8/2017 | Babazadeh | H02M 3/33507 363/21.02 |
| 2017/0346397 A1* | 11/2017 | Babazadeh | H02M 3/1584 |
| 2017/0353116 A1* | 12/2017 | Zhang | H02M 1/08 |

* cited by examiner

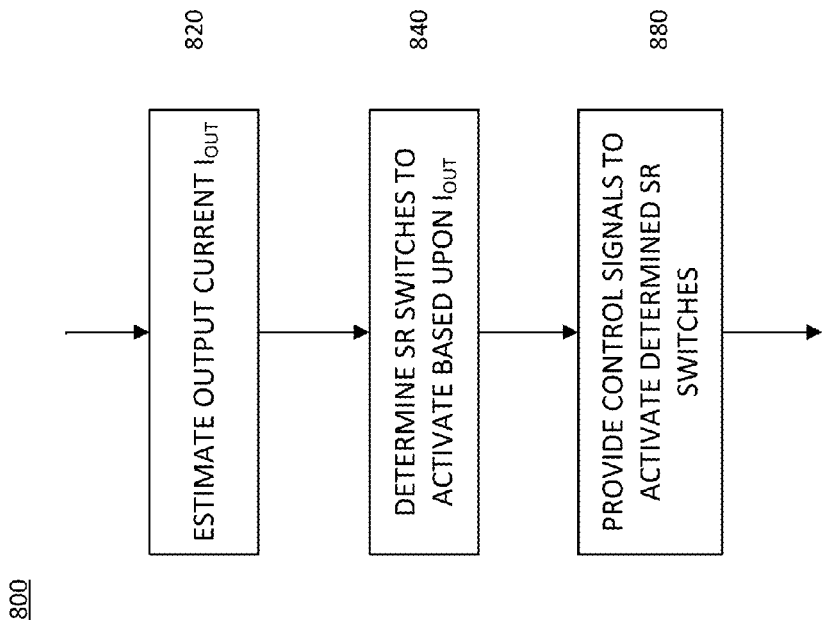

METHOD AND APPARATUS FOR EFFICIENT SWITCHING IN SEMI-RESONANT POWER CONVERTERS

TECHNICAL FIELD

The present application relates to semi-resonant and resonant converters and, in particular, relates to efficient techniques for switching current in such converters by adapting a number of switch devices used for the switching.

BACKGROUND

Resonant and semi-resonant DC-DC converters, including isolated and non-isolated topologies, are used in a variety of applications including telecommunications, consumer electronics, computer power supplies, etc. The usage of such converters is gaining popularity because of their zero-voltage (current) switching characteristic and their ability to utilize parasitic elements inherent in an electronic circuit. Among numerous topologies, the semi-resonant converter with transformer/tapped-inductor is an attractive topology for providing high voltage conversion ratios without using isolation. Such converters provide advantages including lower cost and higher efficiency as compared to other solutions.

A semi-resonant converter typically includes high-side and low-side switches that transfer power from an input source to a transformer/tapped-inductor that supplies output power to a load. The transformer/tapped-inductor is also connected to a second low-side switch device, which is termed a synchronous rectification (SR) switch herein. Due to the "on resistance" of the SR switch, some power will be lost in this switch when current flows through it. For example, a metal-oxide semiconductor field-effect transistor (MOSFET), which is a common switch device used in such applications, is characterized by a drain-to-source resistance $R_{dson}$ in its "on" or conducting state. The power losses can become significant when high currents are flowing through the SR switch. Given that the semi-resonant converter with a transformer/tapped-inductor offers significant advantages for applications requiring a high input-to-output voltage ratio (i.e., a large step-down voltage), such converters are commonly used to convert high-voltage/low-current power into low-voltage/high-current power. The high output current for such usage translates into high current through the SR switch which, in turn, can lead to significant power loss.

Prior techniques for addressing such power loss in power converters have focussed on reducing the effective series resistance (ESR) of the SR switch. One such technique uses larger switches, which typically have lower "on" resistance. Another technique, which may be used in conjunction with the first technique, is to connect a plurality of SR switches in parallel and to control this plurality of SR switches using a common control signal. The effective "on" resistance of the parallel SR switches is thus reduced. Such solutions work well when the output current of a semi-resonant power converter is high, such as when it is under heavy load. However, such solutions are suboptimal for situations in which the output current is relatively low, e.g., when a power converter is only lightly loaded. For this case, the losses associated with the control signal, e.g., gate drive losses or gate charge losses, become significant relative to the conduction loss of the SR switch(es). A larger switch device typically has higher losses associated with its control, and increasing the number of power switches proportionally increases such losses. Considering, for example, the case where the SR switch(es) is/are one or more MOSFETs, the gate charge losses (characterized using the gate resistance $R_g$ of the MOSFET) and gate drive losses become larger than and dominate the conduction losses (characterized by the "on" resistance $R_{dson}$) when the power converter is lightly loaded, i.e., when the power converter is providing relatively low output current.

Accordingly, there is a need for an improved technique that reduces the power loss for SR switches in a power converter when the power converter is supplying high as well as low output currents. Such techniques should apply both to single and multi-phase power converters.

SUMMARY

According to an embodiment of a voltage converter, the voltage converter comprises a power stage, a passive circuit, a synchronous rectification (SR) switch stage and a control circuit. The power stage includes a high-side switch that is coupled to an input power source, and a low-side switch that is coupled to the high-side switch at a switching node of the power stage. The passive circuit couples the switching node to an output node of the voltage converter. The synchronous rectification (SR) switch stage is configured to switchably couple the passive circuit to ground, and the SR switch stage includes a plurality of SR switches that are connected in parallel to each other. Each of the SR switches has a control terminal and, thus, the SR switches can be controlled independently from each other. The control circuit is configured to determine which of the SR switches are on and which of the SR switches are off, and to control the SR switches based upon this determination. The determination of which SR switches are to be used is based upon an estimate of the output current of the voltage converter.

According to an embodiment of a multi-phase voltage converter, the multi-phase voltage converter is operable to input power from an input power source and to output power to an output node. The multi-phase voltage converter comprises a plurality of power train circuits, corresponding to the multiple phases of the voltage converter, and a control circuit.

Each of the power train circuits includes a power stage, a passive circuit, and a synchronous rectification (SR) switch stage. Each power stage includes a high-side switch coupled to the input power source and a low-side switch that is coupled to the high-side switch at a switching node of the power stage. Each of the passive circuits couples the switching node of the power stage within the same power train circuit to the output node of the multi-phase voltage converter. Each SR switch stage is configured to switchably couple the passive circuit within the same power train circuit to ground. Each of the SR switch stages comprises at least one SR switch, and the SR switch stage for at least one of the power train circuits includes a plurality of SR switches connected in parallel to each other and which may be independently controlled.

The control circuit is configured to control which of the SR switches within the SR switch stages are on and which of the SR switches are off. The determination of which SR switches are on and off is based upon an estimate of the output current of the multi-phase voltage converter.

According to an embodiment of a method, a method is provided for controlling synchronous rectification (SR) switches within a semi-resonant voltage converter. The voltage converter comprises a power stage having a high-side switch coupled to an input power source and a low side switch coupled to the high-side switch at a switching node, a passive circuit coupling the switching node to an output node of the power converter, and an SR switch stage configured to switchably couple the passive circuit to ground. The SR switch stage includes a plurality of SR switches connected to each other in parallel, and which are independently controllable. The method for controlling these SR switches comprises: estimating an output current of the voltage converter, determining which SR switches to activate based upon the estimated output current, and providing control signals to turn on the SR switches that are determined to be activated.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description that follows.

FIG. 8 illustrates a flow diagram corresponding to a method for determining SR switches that are to be activated within voltage converter.

DETAILED DESCRIPTION

Embodiments described herein provide for reducing the power loss associated with synchronous switches within resonant or semi-resonant DC-DC power converters and, thereby, provide more power-efficient DC-DC power converters. Of particular interest is a power converter topology based upon a transformer/tapped-inductor that allows for high voltage conversion ratios without requiring isolation. One such topology couples the transformer/tapped-inductor to ground using a switch known as a synchronous rectification (SR) switch. Because of its ability to support high voltage conversion ratios, this topology is particularly appropriate for applications requiring an output power supply that provides a relatively low voltage and a relatively high current. This high current must also flow through the above-mentioned SR switch and, in so doing, may generate significant power loss caused by the conduction resistance of the SR switch.

The embodiments described herein minimize the power loss of the above-described resonant or semi-resonant DC-DC power converter by replacing the SR switch with a plurality of SR switches connected in parallel, and by scaling the number of activated parallel SR switches to match the needs of an output load. More particularly, an output current, that is being provided by a voltage converter to a load, is estimated. This current estimate is then used to activate/enable an appropriate number of SR switches. For example, when the voltage converter is highly loaded, all of the parallel SR switches would be activated. This reduces the effective resistance through the SR switches which, in turn, reduces the conduction losses of the power converter. Note that such use of multiple SR switches increases the overall control terminal losses (e.g., the gate loss in a metal-oxide semiconductor field-effect transistor, or MOSFET), but these losses represent an insignificant contribution to the losses when the power converter is operating under high load. Conversely, under light load conditions, fewer than all of the parallel SR switches, e.g., a single one of the SR switches, would need to be activated. The control terminal losses are thus reduced for this situation, in which the control terminal losses represent a significant contribution to the overall losses of the power converter.

Various embodiments of voltage converter circuits and methods within voltage converters will be provided in the following detailed description and the associated figures. These embodiments are directed to both single-phase and multi-phase voltage converters. The described embodiments provide particular examples for purposes of explanation, and are not meant to be limiting. Features and aspects from the example embodiments may be combined or re-arranged except where the context does not allow this.

Figure 1:
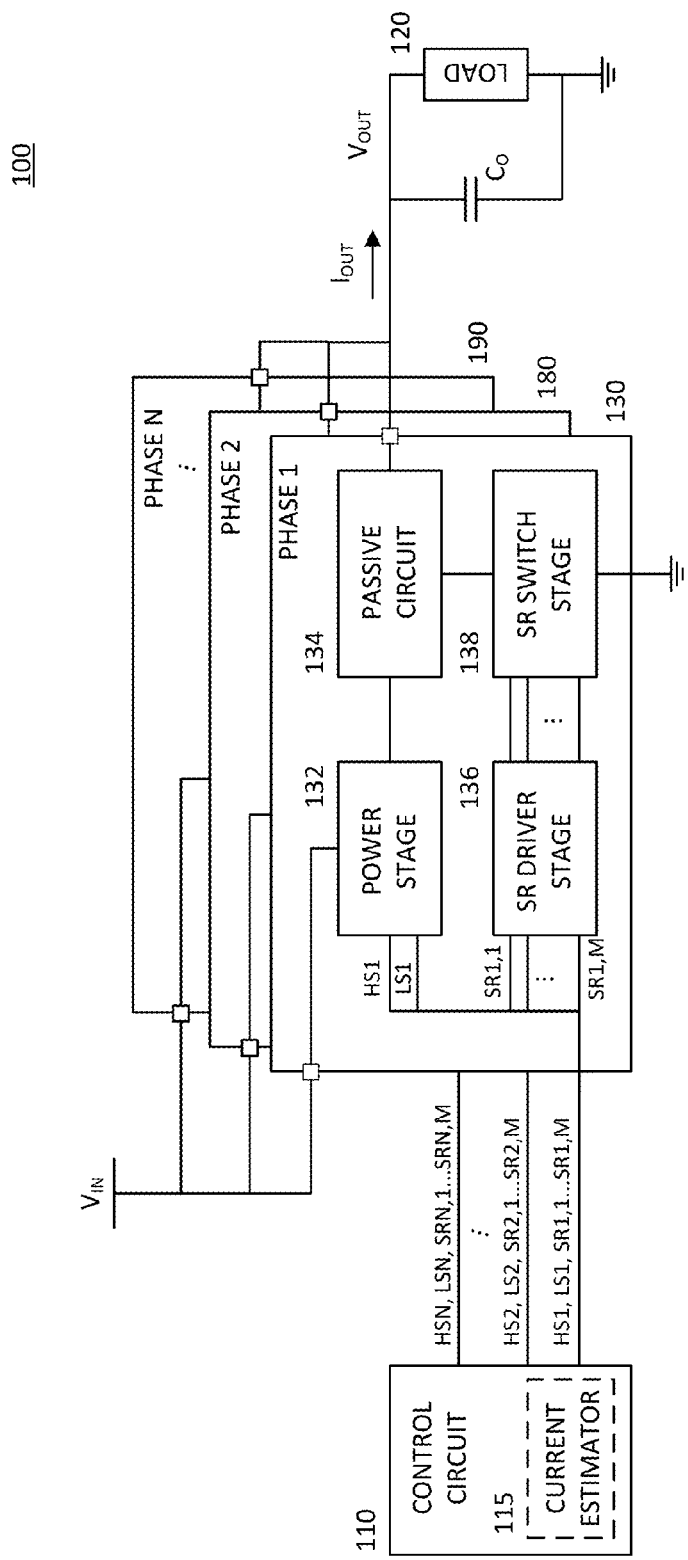
FIG. 1 illustrates a block diagram of an embodiment of a multi-phase voltage converter having a synchronous rectification (SR) switch stage that includes multiple SR switches.

FIG. 1 illustrates an embodiment of a voltage converter 100 that is configured to input power from a power source $V_{IN}$ and output power for driving a load 120. The voltage converter 100 supplies a current $I_{OUT}$ to the load 120 and a capacitor $C_O$ that serves to filter the output voltage $V_{OUT}$. The voltage converter of FIG. 1 includes multiple phases 130, 180, 190. Phase 1 (130), which is taken as representative of the multiple phases, is illustrated in block diagram form, with the understanding that the other phases would be similarly configured.

As illustrated, phase 1 (130) includes a passive circuit 134 that couples a power stage 132 to the voltage converter output $V_{OUT}$. The power stage 132 inputs switch control signals HS1 and LS1 for controlling switches therein. The switches within the power stage 132 typically require drivers (not shown for ease of illustration). The passive circuit 134 is coupled to a synchronous rectification (SR) switch stage 138 which serves to switchably couple the passive circuit 134 to ground. The SR switch stage 138 includes one or more SR switches (not shown) that are connected in parallel. The SR switches are controlled by an SR driver stage 136 coupled to the SR switch stage 138. The SR switch stage in at least one phase of the voltage converter 100 includes a plurality of SR switches connected in parallel.

A control circuit 110 controls the switches of the power stage and the SR switch stage for each of the phases of the voltage converter 100. The control circuit 110 determines a switching frequency for the voltage converter based upon the load requirements, and drives switch control signals (e.g., HS1, LS1, SR1) for the respective phases of the voltage converter 100. These control signals are typically pulse-width-modulated (PWM) waveforms, each of which is driven with a frequency and duty cycle determined by the control circuit 110 based upon the requirements of the load 120. The PWM (switching) frequency is variable and changes as the load requirements change. Such operation, including the determination of the variable switching frequency and the duty cycle, is well-known in the art, and will not be further detailed herein in order to avoid obfuscating the unique aspects of this invention.

The control circuit 110 further determines which of the SR switches to activate or enable within the SR switch stage of each phase. As described previously, at least one of the SR switch stages includes multiple SR switches connected in parallel. The enablement or activation of the SR switches is performed in conjunction with the SR driver stage 136. The control circuit 110 determines which of the SR switches to enable or activate based upon an estimate of the output current provided by a current estimator 115. The current estimator 115 is illustrated as part of the control circuit 110 in FIG. 1, but may be implemented elsewhere. The current estimator 115 may estimate the output current based upon a measurement of the current $I_{OUT}$ provided to the load 120, or based upon current measurements (not shown) made within the individual phases 130, 180, ... 190 of the voltage converter 100. As will be explained in further detail below, the control circuit 110 will enable or activate all of the SR switches within the voltage converter 100 when the current estimation indicates a full-load condition. When the voltage converter 100 is not fully loaded, the control circuit 110 activates/enables a subset of the SR switches including, for a limiting case, activating/enabling a single SR switch for the lightest load condition.

The following description will first focus upon a single-phase of a voltage converter such as that illustrated in FIG. 1. Descriptions of embodiments that relate primarily to multi-stage voltage converters are provided later. This is followed by descriptions directed to methods for controlling the SR switches within voltage converters, such as that illustrated in FIG. 1.

Figure 2A:
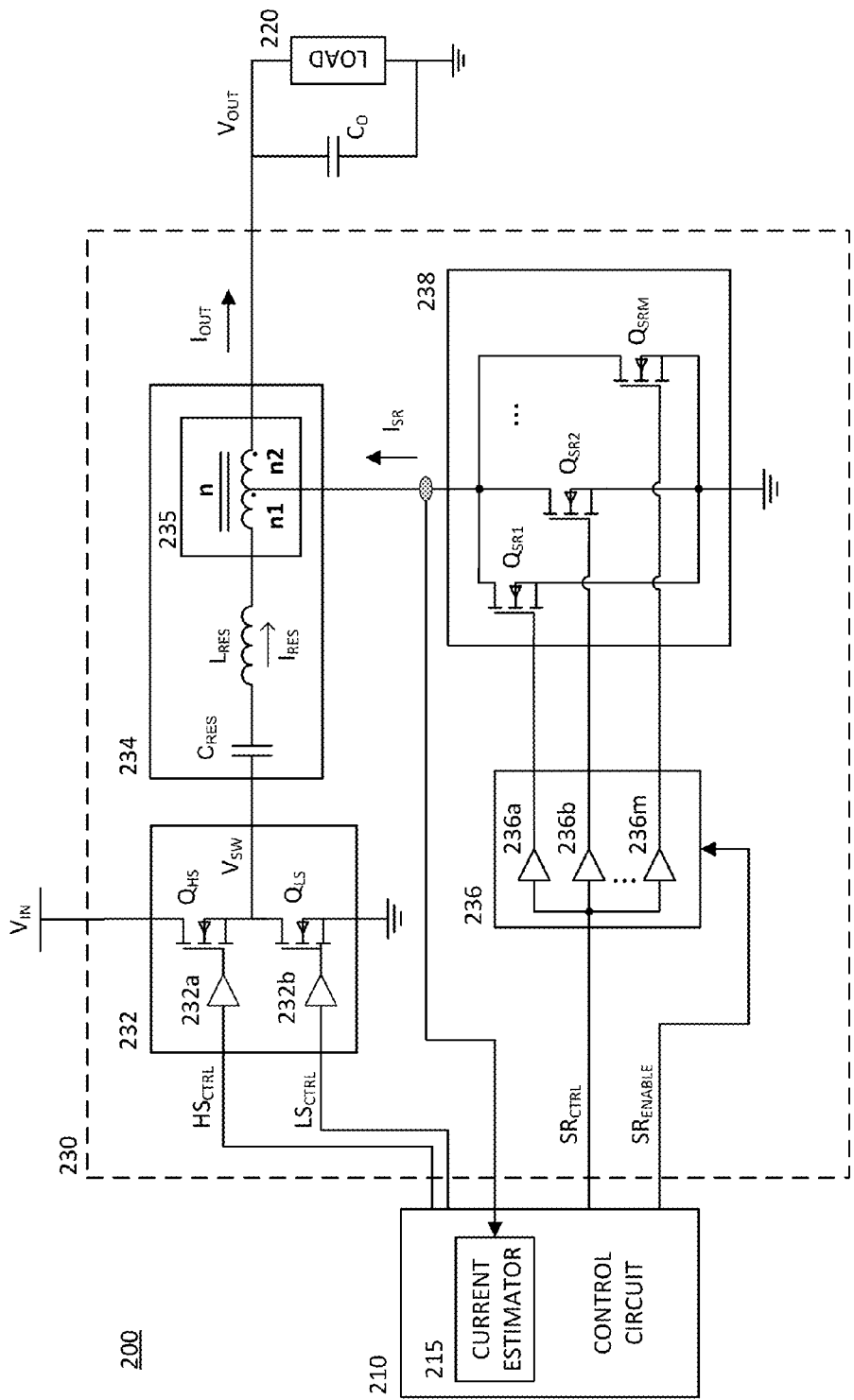
FIG. 2A illustrates a circuit diagram of an embodiment of a single-phase voltage converter or one phase of a multi-phase voltage converter, wherein the voltage converter includes an SR switch stage with multiple SR switches.

FIG. 2A illustrates a circuit diagram 200 corresponding to an embodiment of a voltage converter. The circuit 200 of FIG. 2A may represent a voltage converter having a single phase. Alternatively, the power train circuit shown in the dotted box 230 may be replicated leading to a multi-phase voltage converter such as that shown in FIG. 1.

An input voltage $V_{IN}$ is input to a power stage 232 at a high-side switch $Q_{HS}$ that is coupled to a low-side switch $Q_{LS}$ at a switching node $V_{SW}$. The low-side switch $Q_{LS}$ is, in turn, connected to ground. Each of these switches $Q_{HS}$, $Q_{LS}$ is controlled by a respective driver 232a, 232b as shown. The switching node $V_{SW}$ of the power stage 232 is coupled to a passive circuit 234, which provides an output current $I_{OUT}$ and voltage $V_{OUT}$ to a load 220 of the voltage converter 200. The passive circuit 234 includes a resonant tank comprised of a capacitor $C_{RES}$ and an inductor $L_{RES}$. The inductor $L_{RES}$ may merely be the leakage inductance (e.g., the inherent parasitic inductance of the circuit wiring), or it may be an actual inductor component together with the leakage inductance. The inductor $L_{RES}$ is coupled to a transformer/tapped-inductor 235 having n1 primary-side windings and n2 secondary side windings. The turns ratio n2/n1 determines the output/input voltage ratio of the transformer/tapped-inductor 235 when it is conducting current.

An SR switch stage 238 is connected to the transformer/tapped inductor 235 and serves to couple a center tap of the transformer/tapped-inductor 235 to ground when the SR switch stage 238 is conducting. The SR switch stage 238 comprises a plurality of SR switches $Q_{SR1}$, $Q_{SR2}$, ... $Q_{SRM}$ connected in parallel. While the SR switch stage 238 of FIG. 2A shows M SR switches, the number of SR switches could be as few as two (2) in this embodiment. Each of the switches $Q_{SR1}$, $Q_{SR2}$, ... $Q_{SRM}$ has a control terminal (e.g., a gate) that is used to control the conduction of that switch. Hence, the switches can be independently controlled.

The high-side, low-side, and SR switches $Q_{HS}$, $Q_{LS}$, $Q_{SR1}$, $Q_{SR2}$, ... $Q_{SRM}$ are shown in FIG. 1 as enhancement-mode metal-oxide semiconductor field-effect transistors (MOSFETs), but other switch devices may be used. For example, junction field-effect transistors (JFETs), bipolar junction transistors (BJTs), insulated gate bipolar transistors (IGBTs), high electron mobility transistors (HEMTs), or other types of power transistors may be preferred in some applications. The switches of the power stage 232 and of the SR switch stage 238 (e.g., $Q_{HS}$, $Q_{LS}$, $Q_{SR1}$, $Q_{SR2}$, ... $Q_{SRM}$) may be integrated on the same semiconductor die, may each be provided on separate dies, or may otherwise be spread across a plurality of semiconductor dies. The drivers for the switches may be integrated on the same semiconductor die(s) as their corresponding switches, or may be provided on separate dies.

An SR driver circuit 236 contains drivers 236a, 236b, 236m for the SR switches $Q_{SR1}$, $Q_{SR2}$, ... $Q_{SRM}$. In the embodiment of FIG. 2A, each SR switch $Q_{SR1}$, $Q_{SR2}$, ... $Q_{SRM}$ includes a gate (control terminal) that is driven by a separate driver of the SR driver circuit 236. The SR switches that are being used are determined by an enable signal (or signals) $SR_{ENABLE}$ that is provided to the SR driver circuit 236 by a control circuit 210. As similarly explained in the description of the control circuit 110 of FIG. 1, the control circuit 210 generates PWM signals $HS_{CTRL}$, $LS_{CTRL}$ that control the power stage switches $Q_{HS}$, $Q_{LS}$, as well as PWM signal $SR_{CTRL}$ that controls the SR switch stage 238. More particularly, the PWM signal $SR_{CTRL}$ controls when the SR switch stage 238 conducts and when it does not. The control circuit 210 determines the frequency and duty cycle of the PWM signal $SR_{CTRL}$ so as to meet the power requirements of the load 220. In a semi-resonant voltage converter such as that of FIG. 2A, the high and low-side switches $Q_{HS}$, $Q_{LS}$ of the power stage 232 are controlled such that these switches do not conduct at the same time. A typical switching cycle of a voltage converter, such as that of FIG. 2, begins with a "dead time" during which neither of the switches $Q_{HS}$, $Q_{LS}$ of the power stage 232 are conducting. This is followed by a "Ton" period during which the high-side switch $Q_{HS}$ is conducting, but the low-side switch $Q_{LS}$ is not conducting. A "Toff" period follows this during which the high-side switch $Q_{HS}$ is not conducting, but the low-side switch $Q_{LS}$ is conducting. The timing of the SR switch stage follows that of the low-side switch $Q_{LS}$, i.e., the SR switch stage conducts when the low-side switch $Q_{LS}$ is conducting and the high-side switch $Q_{HS}$ is not conducting.

In addition to generating the PWM signals required by the power train circuit 230, the control circuit 210 also determines which of the SR switches $Q_{SR1}$, $Q_{SR2}$, ... $Q_{SRM}$ are to be used when the SR switch stage 238 is conducting. The SR switches that are to be used are based upon a current estimate determined by a current estimator 215, which is shown within the control circuit 210. As shown in FIG. 2A, the current estimation is based upon a measurement of the current $I_{SR}$ flowing through the SR switch stage 238. For a multi-phase voltage converter, such measurements of $I_{SR}$ may be made for each of the phases, or the current through one phase may be used as exemplary. The current measurement could also be made elsewhere within the power train circuits of each phase, provided that such current measurement can be used to appropriately estimate the output current of the voltage converter. The control circuit 210 may use per-phase current estimates separately, or may aggregate per-phase current estimates. Alternatively, the current estimate could be based upon a measurement taken on the output current $I_{OUT}$ (not shown), which effectively includes the contributions of all of the phases. The current $I_{SR}$ may be measured by using the effective on-state resistance ($R_{dson}$) of the active/enabled parallel SR switches and the voltage across the SR switch stage 238, or by using a current mirror. The current measurement, for $I_{SR}$ or otherwise, may also be accomplished by using other standard means such as measuring the voltage across a sensing resistor, or by using direct current sensing (DCR) techniques.

Figure 2B:
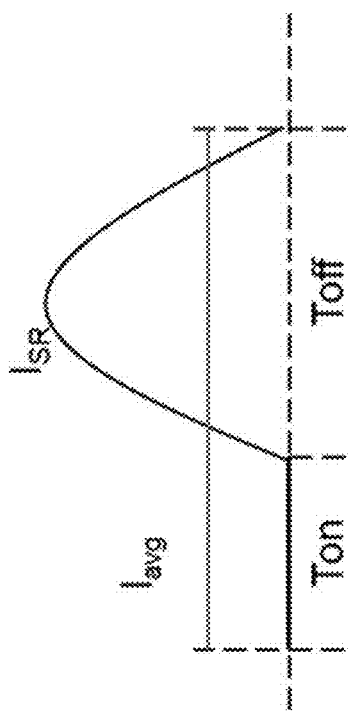
FIG. 2B illustrates a waveform representing the current through the SR switch stage of the circuit illustrated in FIG. 2A.

If the current is measured within an individual phase of the voltage converter circuit, it may be necessary for the current estimator 215 to average the measured current over some period of time, e.g., one switching cycle of the voltage converter. For example, the current $I_{SR}$ through the SR switch stage 238 for the circuit of FIG. 2A takes the shape of a half-sinusoid, as illustrated in the waveform of FIG. 2B. Within FIG. 2B, the period Ton represents the time period when the high-side switch $Q_{HS}$ is conducting. The period Toff represents the time period when the high-side switch $Q_{HS}$ not conducting, and also corresponds to the time period when the SR switch stage 238 is conducting. It is during the "Toff" period that the SR current $I_{SR}$ conducts and takes on the half-sinusoidal shape. The current estimator may take multiple measurements within the switching cycle corresponding to Tcycle=Ton+Toff, and average them to arrive at an estimated current $I_{avg}$, such as that illustrated.

The control circuit 210 uses the estimated current to determine the number of SR switch devices within the SR switch stage 238 to activate/enable. When the estimated current is high (e.g., above a high-load threshold), indicating a full-load condition, the control circuit 210 determines that all of the SR switch devices should be activated/enabled. When the estimated current is low (e.g., below a low-load threshold), indicating a light-load condition, the control circuit 210 determines that only one of the SR switch devices should be activated/enabled. If the current estimate is within a middle range and the SR switch stage 238 contains more than two SR switches, then a subset of the SR switches is activated/enabled based upon the current estimate. For example, the number of activated/enabled SR switches may be chosen based upon a linear mapping from the current estimate to the number of SR switches.

The activation/enablement of the SR switches is accomplished using the $SR_{ENABLE}$ signal generated by the control circuit 210 and provided to the SR driver circuit 236. This signal may, for example, indicate to the SR driver circuit 236 how many of the SR switches are to be enabled. Alternatively, this signal may indicate exact ones of the SR switches that are be activated. For either case, the SR driver circuit 236 uses the $SR_{ENABLE}$ signal to enable the drivers corresponding to those SR switches that are to be activated, and to disable the drivers corresponding to those SR switches that are not to be activated.

The embodiment described above and illustrated in FIG. 2A presumes that the SR switches $Q_{SR1}$, $Q_{SR2}$, ... $Q_{SRM}$ are substantively equivalent, i.e., that they are of the same type and have similar electrical properties (e.g., $R_{dson}$). In an alternate sub-embodiment, the SR switches may be sized differently such that the "on" resistance of the devices differs substantively. For example, the SR switch stage 238 may have only two SR switches. A first SR switch $Q_{SR1}$ may be a relatively small MOSFET having low gate losses, but high drain-to-source on resistance ($R_{dson}$) and associated power loss in its conducting state. A second SR switch $Q_{SR2}$ may be a relatively large MOSFET having high gate losses, but low drain-to-source on resistance ($R_{dson}$) and associated power loss in its conducting state. For such an embodiment, the control circuit 210 would enable/activate only the first SR switch $Q_{SR1}$ when the current estimate indicates that the voltage converter is lightly loaded. When the current estimate indicates that the voltage converter is fully loaded, the control circuit 210 may determine that only the second SR switch $Q_{SR2}$ will be activated/enabled or that both SR switches $Q_{SR1}$, $Q_{SR2}$ will be activated/enabled.

Figure 3:
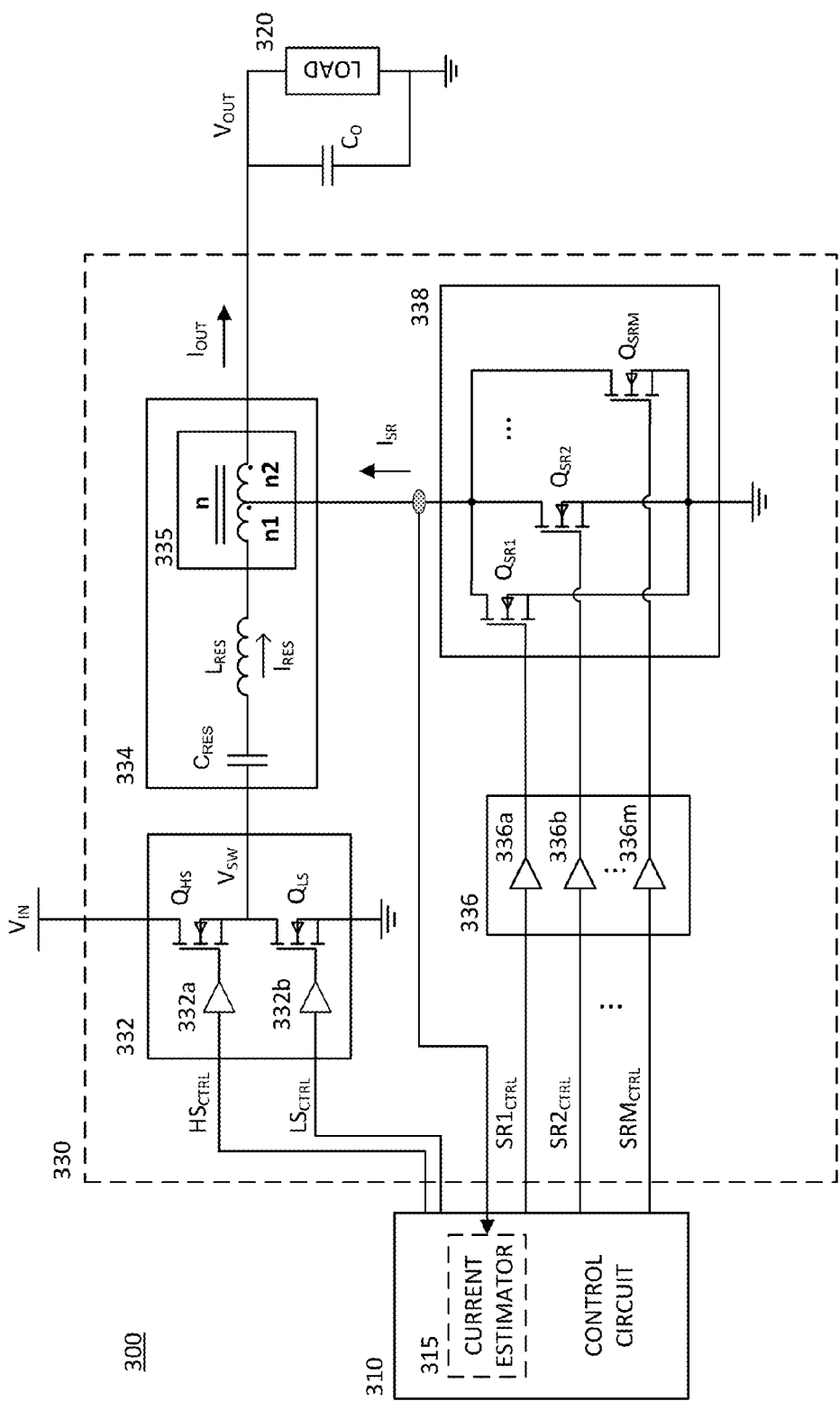
FIG. 3 illustrates a circuit diagram of an alternate embodiment of a single-phase voltage converter or one phase of a multi-phase voltage converter having multiple SR switches, wherein individual control signals are provided for controlling the SR switches.

FIG. 3 illustrates a circuit diagram 300 corresponding to another embodiment of a voltage converter. As with the circuit of FIG. 2A, the circuit 300 of FIG. 3 may represent a voltage converter having a single phase. Alternatively, the illustrated power train circuit 330 may be replicated leading to a multi-stage voltage converter such as that illustrated in FIG. 1. The circuit of FIG. 3 is similar to that of FIG. 2A, and only the aspects wherein FIG. 3 differs are described below.

In the embodiment of FIG. 2A, the control circuit 210 outputs one control signal $SR_{CTRL}$ (e.g., a PWM waveform) to control when the SR switch stage 238 should conduct, whereas the enable signal $SR_{ENABLE}$ was used to determine which of the SR switches within the SR switch stage 238 to activate during conduction. In contrast to this, the control circuit 310 of FIG. 3 does not output an enable signal. Instead, the control circuit 310 outputs separate control signals $SR1_{CTRL}$, $SR2_{CTRL}$, ... $SRM_{CTRL}$ for each of the SR switches and their corresponding drivers 336a, 336b, 336m. In this way, the enablement/activation of the SR switches is effectively merged with the control of the SR switches. This embodiment has the advantages that the SR driver circuit 336 does not need to support enabling of its drivers 336a, 336b, 336m, and that the enable signal(s) between the control circuit 310 and the SR driver circuit 336 is/are not needed. However, this embodiment requires additional control signals $SR1_{CTRL}$, $SR2_{CTRL}$, ... $SRM_{CTRL}$, so it may not be preferred in some applications.

Figure 4:
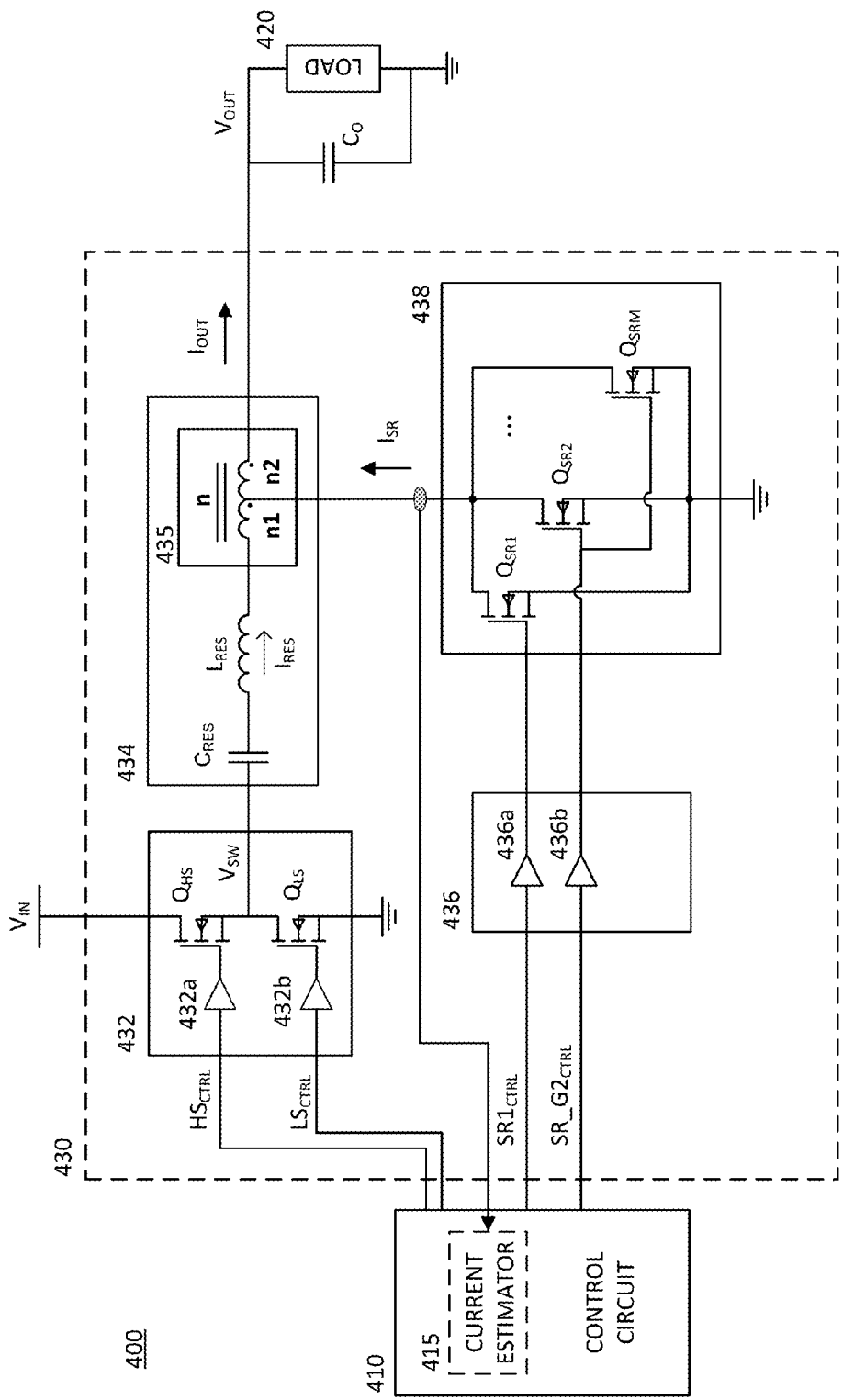
FIG. 4 illustrates a circuit diagram of yet another alternate embodiment of a single-phase voltage converter or one phase of a multi-phase voltage converter having multiple SR switches, wherein one driver can drive multiple SR switches.

FIG. 4 illustrates a circuit diagram 400 corresponding to another alternative embodiment of a voltage converter. This circuit 400 is similar to that of FIG. 3, and only those aspects wherein the embodiment of FIG. 4 differs will be described below.

The embodiments of FIGS. 2 and 3 included dedicated drivers within the SR driver circuits 236, 336 for each of the SR switches of the SR switch stages 238, 338. However, a single driver may be used to drive the control terminals (e.g., gates) of multiple SR switches. This is illustrated in FIG. 4, wherein a first driver 436a, located within the driver circuit 436, is provided with a first control signal $SR1_{CTRL}$ from the control circuit 410, and controls a first SR switch $Q_{SR1}$ of the SR switch stage 438. A second driver 436b, also located within the driver circuit 436, is provided with a second control signal SR_G2$_{CTRL}$ that controls a group of SR switches within the SR switch stage 438. In the illustrated embodiment, the second control signal SR_G2$_{CTRL}$ and driver 436b control all but one of the SR switches, e.g., they control SR switches Q$_{SR2}$ through Q$_{SRM}$. While this embodiment makes use of only two drivers wherein one driver controls one switch and the other driver controls (M−1) switches, other combinations are possible and may be preferred in some applications. For example, a first driver may control two switches whereas a second driver controls three switches, etc.

Figure 5:
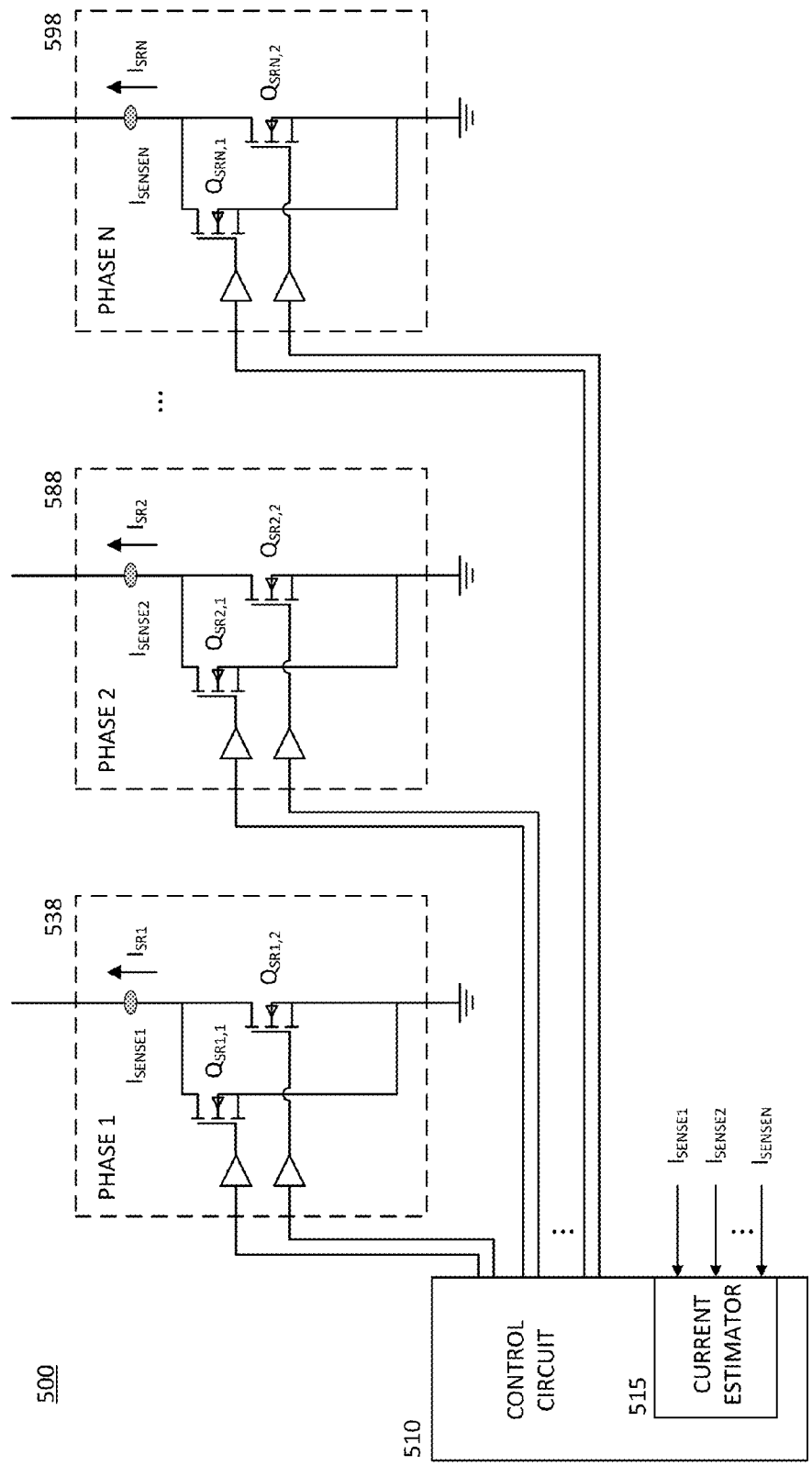
FIG. 5 illustrates a circuit diagram directed to a multi-phase voltage converter in which each phase contains two SR switches.
Figure 6:
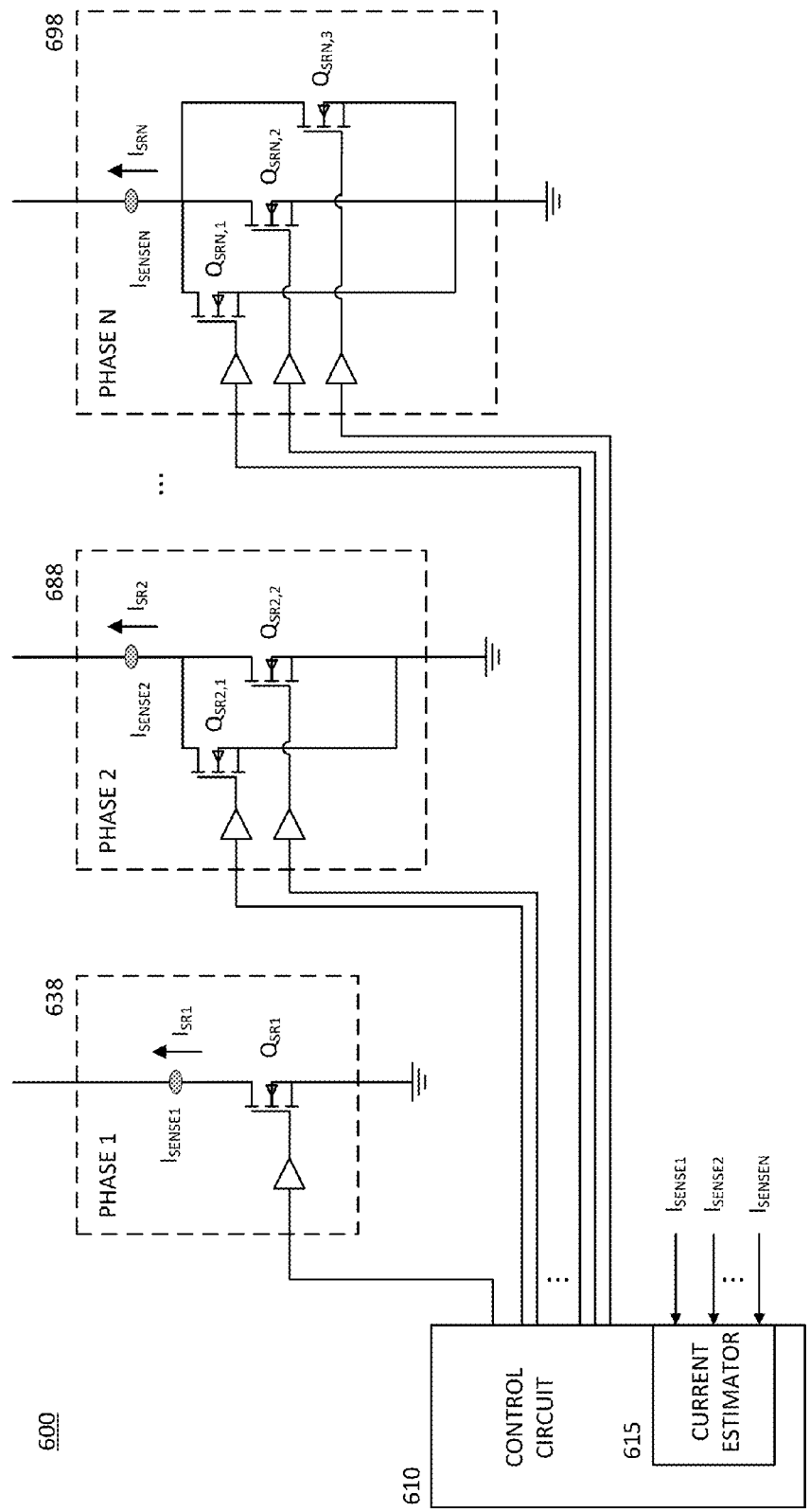
FIG. 6 illustrates a circuit diagram directed to a multi-phase voltage converter in which the phases include various numbers of SR switches.
Figure 7:
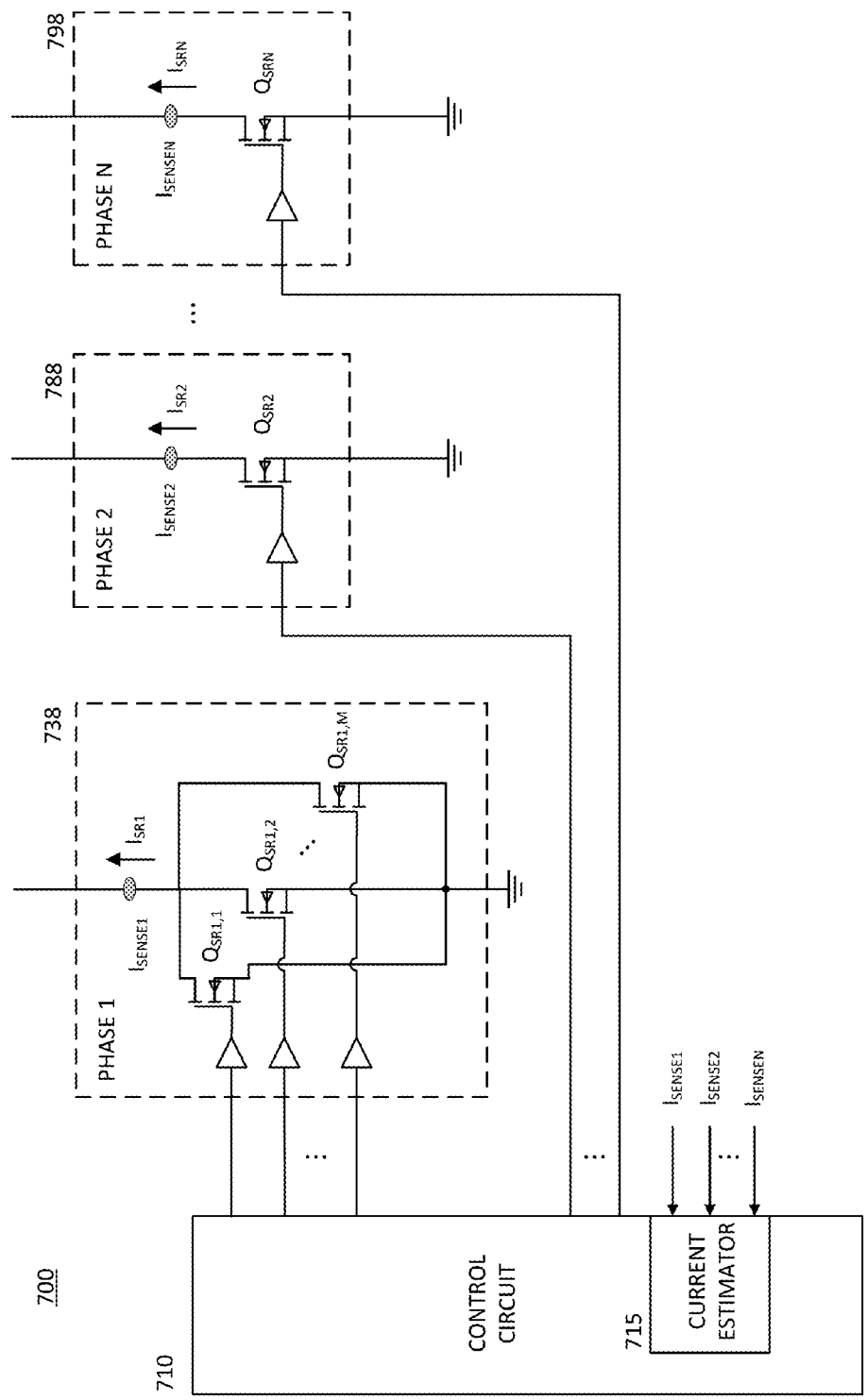
FIG. 7 illustrates a circuit diagram directed to a multi-phase voltage converter in which one phase includes a plurality of SR switches and the remaining phases contain only a single SR switch.

FIGS. 5-7 illustrate embodiments of multi-stage voltage converters, and include a control circuit that is responsible for providing control signals to a plurality of phases, each of which may be represented by a power train circuit. For ease of illustration, only the SR switch stage of each power train circuit is illustrated in these figures. The other parts of the power train circuits are the same or similar to sub-circuits of the power train circuits illustrated in FIGS. 2-4. Note that the current estimator of FIGS. 5-7 is illustrated as using current measurements corresponding to the current through the SR switch stages of each power train circuit. As explained regarding the embodiment of FIG. 2A, other techniques for measuring the current are also possible.

FIG. 5 illustrates a control circuit 510, including a current estimator 515, that is used for controlling the SR switch stages 538, 588, 598 within each of N power train circuits of an N-phase power converter 500. In this embodiment, each of the SR switch stages includes two (2) SR switches, e.g., Q$_{SR1,1}$, Q$_{SR1,2}$. As in the embodiments of FIGS. 3 and 4, the control circuit 510 only generates control signals corresponding to those SR switches that are active, as determined by the current estimation.

In a first sub-embodiment of the circuit 500 of FIG. 5, the SR switches are of the same type and size. In this embodiment, all of the phases are always enabled, i.e., there is always at least one SR switch active in each power train circuit. Such an implementation with all phases active has the advantage that ripple on the output voltage is minimal. When the voltage converter is heavily loaded, as determined by detecting that the estimated current is higher than a load threshold, then all of the SR switches Q$_{SR1,1}$, Q$_{SR1,2}$, Q$_{SR2,1}$, Q$_{SR2,2}$, . . . Q$_{SRN,1}$, Q$_{SRN,2}$ are activated and used. When the estimated current is at or below the load threshold, then a single SR switch, e.g., Q$_{SR1,1}$, Q$_{SR2,1}$, . . . Q$_{SRN,1}$, is activated in each of the power train circuits.

In a second sub-embodiment of the circuit 500 of FIG. 5, the SR switches within each SR switch stage are sized differently. The first switches Q$_{SR1,1}$, Q$_{SR2,1}$, . . . Q$_{SRN,1}$ of each power train circuit are "small" in that they have relatively low gate resistance, but relatively high drain-to-source resistance (R$_{dson}$). The second switches Q$_{SR1,2}$, Q$_{SR2,2}$, . . . Q$_{SRN,2}$, of each power train circuit are "large" in that they have relatively high gate resistance, but low R$_{dson}$. As similarly explained in the alternate sub-embodiment accompanying FIG. 2A, the control circuit 510 activates only the first set of SR switches when the current estimate is at or below a load threshold, and activates the second set of SR switches or both the first and second set of SR switches when the current exceeds the load threshold.

In yet a third embodiment of the circuit 500 of FIG. 5, the control circuit 510 may deactivate entire power train circuits (phases) of the power converter when the power converter is lightly loaded. For example, when the current estimate indicates that the voltage converter is fully loaded, then the SR switches are active in the SR switch stages 538, 588, 598 for all of the power train circuits (phases). When the current estimate drops below a first threshold, then one of the phases is shed by deactivating the power stage and the SR switch stage associated with that phase, e.g., the control circuit 510 may deactivate the switches Q$_{SRN,1}$, Q$_{SRN,2}$ within the SR switch stage 598 associated with phase N. When the current estimate drops below a second threshold, then another of the phases is shed by deactivating the power stage and the SR switch stage associated with that phase. Such operation continues until only a single phase, e.g., phase 1, remains active. When the current estimate drops below a light load threshold, then the control circuit 510 deactivates all but one of the SR switches within the remaining SR switch stage, e.g., the control circuit 510 may only keep the first switch Q$_{SR1,1}$ of the first SR switch stage 238 active under a light load condition. Such operation leads to minimal gate losses, but comes at the expense of increased output voltage ripple compared to embodiments in which all phases are kept active.

FIG. 6 illustrates a circuit 600 similar to that of FIG. 5, but within which SR switch stages 638, 688, 698 of the different phases have varying numbers of SR switches. Such a circuit is particularly appropriate for embodiments in which the control circuit 610 sheds entire phases, as described above regarding the embodiment of FIG. 5. The SR switches may be of the same type and size, or the SR switch sizes may vary to better balance the effective on resistance (R$_{dson}$) of each of the SR switch stages 638, 688, 698. For example, the SR switch Q$_{SR1}$ of the first SR switch stage 638 may be chosen to be large and have a low R$_{dson}$ (but relatively high gate resistance), whereas the R$_{dson}$ of the switches of the Nth SR switch stage 698 may be chosen to have relatively low gate resistances (but higher individual R$_{dson}$). When the load of the voltage converter decreases, as indicated by the current estimate dropping below a threshold, the first phase is shed by deactivating power stage for the first phase and the SR switch Q$_{SR1}$ of the first SR switch stage 638. As the load decreases further, the second phase is shed by deactivating the power stage and the SR switches Q$_{SR2,1}$ Q$_{SR2,2}$ of the second SR switch stage 688. As the load decreases further, such operation continues until only the Nth phase is left. At this point, the control circuit 610 may continue decreasing active switches by deactivating individual switches, e.g., Q$_{SRN,2}$, Q$_{SRN,3}$ until only a single SR switch, e.g., Q$_{SRN,1}$, remains. As the load of the voltage converter increases, the SR switches and power stages are re-activated in reverse order.

FIG. 7 illustrates yet another circuit 700 that is particularly appropriate for shedding entire phases of a multi-phase voltage converter as the load decreases. In this embodiment, all of the phases have a single SR switch, e.g., Q$_{SR2}$ . . . Q$_{SRN}$, except for the first phase wherein the first SR switch stage 738 contains a plurality of switches. For moderate loads below a fully-loaded condition, phases 2 to N can be successively shed by deactivating their associated SR switches Q$_{SR2}$ . . . Q$_{SRN}$ and power stages. For light loads, only SR switches within the first SR switch stage 738 are active. The number of active SR switches within the first SR switch stage 738 may be varied according to the estimated current. For example, for very light loads, only a single SR switch, e.g., Q$_{SR1,1}$, within the circuit 700 may be actively used by the control circuit 710.

FIGS. 8-11 illustrate embodiments of methods that may be used in the control of SR switches within voltage converters such as those illustrated in FIGS. 1, 2A, and 3-7. The methods of FIGS. 8-10 apply to both single and multi-stage resonant and semi-resonant voltage converters, such as those described previously. The method of FIG. 11 applies only to multi-stage voltage converters.

FIG. 8 illustrates, at a high level, an embodiment of a method 800 for determining the SR switches to activate in a voltage converter such as that illustrated in FIG. 1 or 2A. First, an output current $I_{OUT}$ is estimated 820. This current may be estimated by directly measuring the output current $I_{OUT}$ or it may be estimated based upon other current measurements within a voltage converter, e.g., the currents flowing through the SR switches of individual stages within a multi-stage voltage converter. Next, it is determined which and/or how many SR switches to activate 840. This determination is based upon the estimated current $I_{OUT}$. Lastly, control signals are provided to the SR switches that are determined to be active 880.

Figures 9, 10:
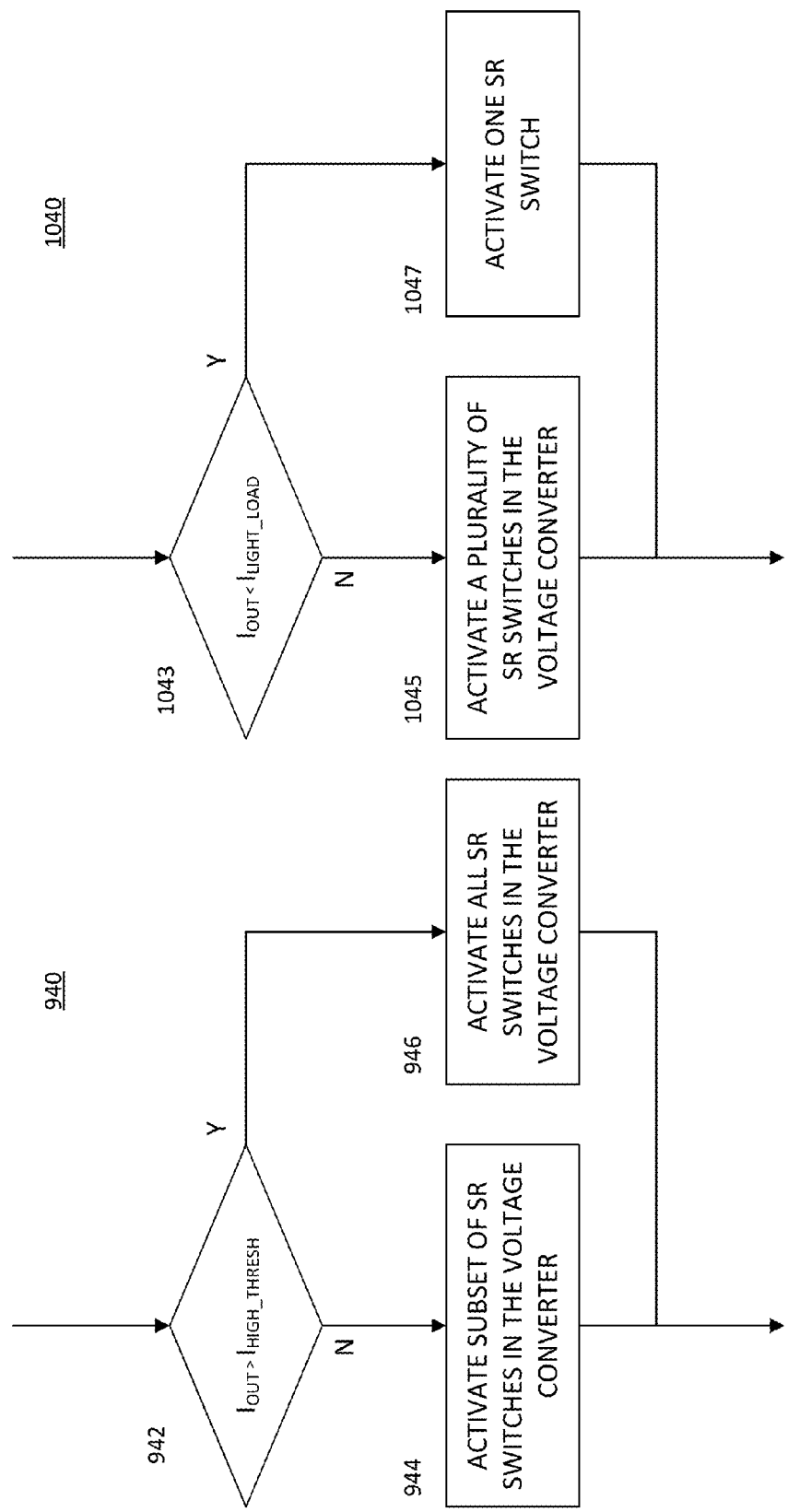
FIG. 9 illustrates a flow diagram describing detailed techniques for performing portions of the method of FIG. 8.
FIG. 10 illustrates a flow diagram describing detailed techniques for performing portions of the method of FIG. 8.

FIGS. 9 and 10 illustrate more specific methods for determining which and/or how many SR switches to activate 840, as described in FIG. 8. The techniques of FIGS. 9 and 10 may be used together or separately. Note that other alternatives to the specific techniques of FIGS. 9 and 10 are also possible within the method of FIG. 8.

FIG. 9 illustrates a method 940 that begins by comparing 942 the estimated current $I_{OUT}$ against a threshold $I_{HIGH\_THRESH}$ associated with a fully loaded condition of a voltage converter. If the current estimate is higher than this threshold $I_{HIGH\_THRESH}$, then all of the SR switches in the voltage converter are activated 946. Otherwise, a subset of the SR switches in the voltage converter are activated 944.

FIG. 10 illustrates a method 1040 that begins by comparing 1043 the estimated current $I_{OUT}$ against a threshold $I_{LIGHT\_LOAD}$ associated with a lightly-loaded condition of a voltage converter. If the current estimate is lower than this threshold $I_{LIGHT\_LOAD}$, then a single one of the SR switches in the voltage converter is activated 1047. (All other SR switches are not activated.) Otherwise, a plurality of the SR switches in the voltage converter are activated 1045.

Figure 11:
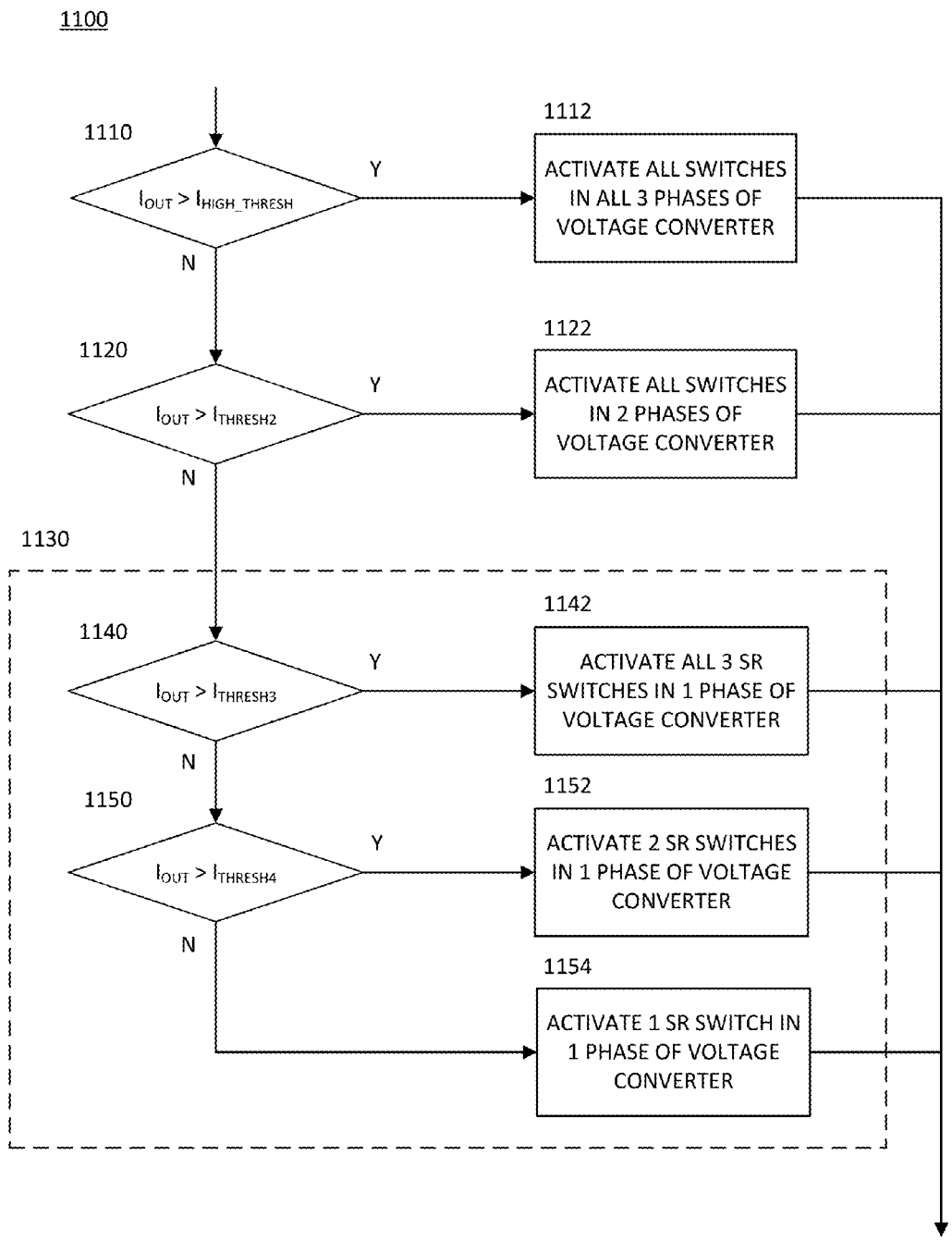
FIG. 11 illustrates a flow diagram directed to a method for determining and activating SR switches within a multi-stage voltage converter.

FIG. 11 illustrates an embodiment of an exemplary method 1100 for determining the SR switches to activate in a voltage converter such as that illustrated in FIG. 1. This method only applies to a multi-stage voltage converter. For ease of illustration and description, the method is shown presuming a three-phase voltage converter, in which one of the phases has three SR switches. FIG. 6 illustrates a voltage converter of this sort when its N=3 (phases), as does FIG. 7 when its N=3 (phases) and M=3 (SR switches in its phase 1). Note, however, that this method is readily extrapolated to voltage converters having other numbers of phases, e.g., 2 or more than 3. Additionally, the method may be extrapolated to voltage converters having a first phase having something other than 3 SR switches. The method does require that the voltage converter comprises a plurality of phases, and that at least one of the phases comprises a plurality of SR switches.

The method of FIG. 11 begins by comparing 1110 the estimated current $I_{OUT}$ against a threshold $I_{HIGH\_THRESH}$. If the current estimate is higher than this threshold $I_{HIGH\_THRESH}$, then all of the SR switches in all three phases of the voltage converter are activated 1112. Otherwise, the method proceeds to a comparison 1120 of the estimated current $I_{OUT}$ against a second threshold $I_{THRESH2}$. If the current estimate is higher than this threshold $I_{THRESH2}$, then all of the SR switches in two of the phases of the voltage converter are activated 1122. (A third phase of the voltage converter is effectively disabled since its SR switches are not activated.) Otherwise, only SR switches within a single phase are active 1130. (Two of the phases of the voltage converter are effectively disabled, since their SR switches are not activated.)

Next, the estimated current $I_{OUT}$ is compared 1140 against a third threshold $I_{THRESH3}$. If the current estimate is higher than this threshold $I_{THRESH3}$, then all three of the SR switches in a first phase of the voltage converter are activated 1142. Otherwise, the method proceeds to a comparison 1150 of the estimated current $I_{OUT}$ against a fourth threshold $I_{THRESH4}$. If the current estimate is higher than this threshold $I_{THRESH4}$, then two of the SR switches in the first phase of the voltage converter are activated 1152. (One of the SR switches of the first phase is effectively disabled, since it is not activated.) Otherwise, a single SR switch in the first phase of the voltage converter is activated 1154. (The other two of the SR switches of the first phase are effectively disabled, since they are not activated.)

For simplicity, the method illustrated in FIG. 11 shows that all except the first phase are activated by activating all of the SR switches within a phase of the voltage converter. Note, however, that phases having SR switch stages with multiple SR switches may be activated by activating only a subset of the SR switches within a given SR switch stage.

Also for simplicity, the method only addresses the control of SR switch stages, and does not address the control of any other power stage. It should be understood that in typical operation, the disabling of a phase would also be accompanied by disabling any power stage associated with that phase.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A voltage converter, comprising:
    a power stage that includes a high-side switch coupled to an input power source and a low-side switch coupled to the high-side switch at a switching node of the power stage;
    a passive circuit coupling the switching node to an output node of the voltage converter;
    a synchronous rectification (SR) switch stage configured to switchably couple the passive circuit to ground or another reference potential, wherein the SR switch stage comprises a plurality of SR switches connected in parallel to each other; and
    a control circuit configured to control which of the SR switches are on and which of the SR switches are off based upon an estimate of a current output of the voltage converter, wherein all of the SR switches are to be on if the estimated current output indicates a full-load condition and one or more of the SR switches are to be off if the estimated current output indicates a light-load condition so that fewer of the SR switches are on during the light-load condition than during the full-load condition.

2. The voltage converter of claim 1, further comprising:
a driver circuit that includes a plurality of drivers, the driver circuit inputting a common control signal that is provided to all of the drivers, each of the drivers providing a driver control signal that is coupled to a control terminal of an SR switch or control terminals of a group of SR switches for controlling an on or off state of the SR switch or the group of SR switches, and wherein an enable signal is input to the driver circuit to determine which drivers are enabled and which drivers are disabled,
and wherein the control circuit is further configured to generate the common control signal and program the enable signal based upon the current output estimate, so as to enable each driver coupled to an SR switch or a group of SR switches that is to be turned on and to disable each driver coupled to an SR switch or a group of SR switches that is to be turned off.

3. The voltage converter of claim 2, wherein the SR switches are of a same switch type and a same switch size, and wherein the enable signal indicates a number of the SR switches to activate.

4. The voltage converter of claim 2, wherein conduction efficiencies of the SR switches differ substantively, and the enable signal indicates a particular one or particular ones of the SR switches to activate.

5. The voltage converter of claim 1, further comprising:
a driver circuit that includes a driver for each of the SR switches, each of the drivers coupling a control signal from the control circuit to a control terminal of an SR switch,
and wherein the control circuit is further configured to activate the control signals for each of the SR switches that are to be turned on, and to deactivate the control signals for each of the SR switches that are to be turned off.

6. A multi-phase voltage converter operable to input power from an input power source and output power to an output node, the multi-phase voltage converter comprising:
a plurality of power train circuits, each power train circuit comprising:
a power stage that includes a high-side switch coupled to the input power source and a low-side switch that is coupled to the high-side switch at a switching node of the power stage;
a passive circuit coupling the switching node to the output node of the multi-phase voltage converter; and
a synchronous rectification (SR) switch stage configured to switchably couple the passive circuit to ground or another reference potential, wherein the SR switch stage comprises at least one SR switch,
wherein the SR switch stage for at least one of the power train circuits includes a plurality of SR switches connected in parallel to each other, and
a control circuit configured to control which of the SR switches are on and which of the SR switches are off based upon an estimate of a current output of the multi-phase voltage converter, wherein all of the SR switches are to be on if the estimated current output indicates a full-load condition and one or more of the SR switches are to be off if the estimated current output indicates a light-load condition so that fewer of the SR switches are on during the light-load condition than during the full-load condition.

7. The multi-phase voltage converter of claim 6, wherein each of the power train circuits further comprises:
a driver circuit that includes a plurality of drivers, the driver circuit inputting a common control signal that is provided to each of the drivers, each of the drivers providing a driver control signal coupled to a control terminal of an SR switch or control terminals of a group of SR switches for controlling an on or off state of the SR switch or the group of SR switches, and wherein an enable signal is input to the driver circuit to determine which drivers are enabled and which drivers are disabled,
and wherein the control circuit is further configured to generate the common control signal and to program the enable signal based upon the current output estimate, so as to enable each driver coupled to an SR switch or a group of SR switches that is to be turned on and to disable each driver coupled to an SR switch or a group of SR switches that is to be turned off.

8. The multi-phase voltage converter of claim 7, wherein the SR switches are of a same switch type and a same switch size, and wherein the enable signal for each power train circuit indicates a number of the SR switches to activate within that power train circuit.

9. The multi-phase voltage converter of claim 7, wherein conduction efficiencies of the SR switches differ substantively, and the enable signal for each power train circuit indicates a particular one or particular ones of the SR switches to activate within that power train circuit.

10. The multi-phase voltage converter of claim 6, wherein each of the power train circuits further comprises:
a driver circuit that includes a driver for each of the SR switches of the power train circuit, each of the drivers coupling a distinct control signal from the control circuit to a control terminal of an SR switch,
and wherein the control circuit is further configured to activate the control signals for each of the SR switches that are to be turned on, and to deactivate the control signals for each of the SR switches that are to be turned off.

11. The multi-phase voltage converter of claim 6, wherein each of the power train circuits includes a same number of SR switches, and the control circuit turns on the same number of switches in each of the power train circuits.

12. The multi-phase voltage converter of claim 6, wherein the control circuit is further configured to turn on all of the SR switches for all of the power train circuits responsive to determining that the estimated current output is above a first predetermined threshold and, otherwise, to turn on one or more SR switches within a first of the power train circuits and to turn off all of the SR switches within all except the first of the power train circuits.

13. The multi-phase voltage converter of claim 12, wherein the control circuit, responsive to a determination that the estimated current output is below a second predetermined level, turns on a single SR switch within the first power rain circuit and turns off all remaining SR switches within the first power train circuit.

14. The multi-phase voltage converter of claim 6, wherein the SR switch stage corresponding to a first of the plurality of power train circuits has a first number of SR switches that differs from a second number of SR switches within the SR switch stage corresponding to a second of the plurality of power train circuits.

15. The multi-phase voltage converter of claim 6, herein each of the SR switches included in a first of the power train circuits is sized differently from the other SR switches within the first power train circuit, such that the SR switches of the first power train circuit do not have a same resistance in their respective conducting states.

16. The multi-phase voltage converter of claim 6, wherein the control circuit is further configured to estimate the current output of the multi-phase voltage converter based upon current estimates for the SR switch stages from each of the power train circuits.

17. A method, within a voltage converter, for controlling synchronous rectification (SR) switches, the voltage converter comprising a power stage having a high-side switch coupled to an input power source and a low side switch coupled to the high-side switch at a switching node, a passive circuit coupling the switching node to an output node of the power converter, and an SR switch stage configured to switchably couple the passive circuit to ground or another reference potential, wherein the SR switch stage comprises a plurality of SR switches connected to each other in parallel wherein the parallel SR switches are independently controllable, the method comprising:

estimating a current output of the voltage converter,
determining that all of the SR switches are to be activated if the estimated current output is above a first predetermined threshold,
determining that only one of the SR switches is to be activated if the estimated current output is below a second predetermined threshold, and
providing control signals to turn on the SR switches that are determined to be activated.

18. The method of claim 17, wherein the voltage converter includes multiple stages, each stage having an SR switch stage comprised of multiple SR switches, wherein determining which SR switches to activate is performed by determining a number of SR switches to activate in each of the SR switch stages.

19. The method of claim 18, wherein the number of SR switches to activate is the same for each of the SR switch stages.

20. The method of claim 17, wherein the voltage converter includes multiple stages and wherein determining which SR switches to activate is performed by determining that all of the SR switches in at least one SR switch stage are not activated.

* * * * *

UNITED STATES PATENT AND TRADEMARK OFFICE
CERTIFICATE OF CORRECTION

| | |
|---|---|
| PATENT NO. | : 9,998,020 B2 |
| APPLICATION NO. | : 15/143068 |
| DATED | : June 12, 2018 |
| INVENTOR(S) | : A. Babazadeh et al. |

It is certified that error appears in the above-identified patent and that said Letters Patent is hereby corrected as shown below:

Column 14, Line 60 (Claim 13, Line 5), please change "rain" to -- train --.

Signed and Sealed this
Twenty-eighth Day of August, 2018

Andrei Iancu
*Director of the United States Patent and Trademark Office*